Feb. 4, 1930.    J. N. REYNOLDS ET AL    1,745,714
METEOROLOGICAL INDICATOR
Filed Nov. 1, 1919    2 Sheets-Sheet 2
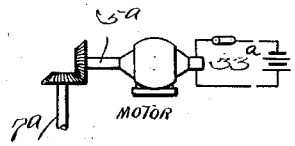
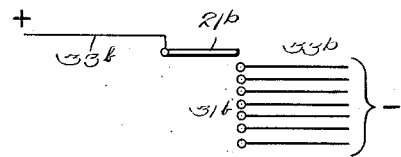
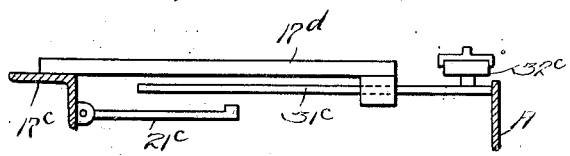
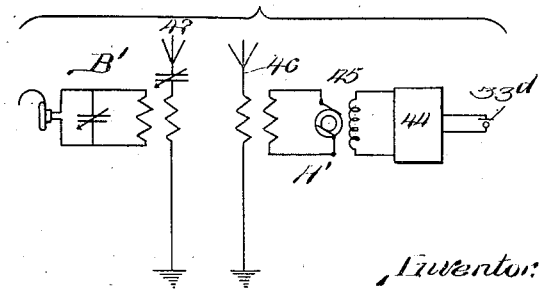

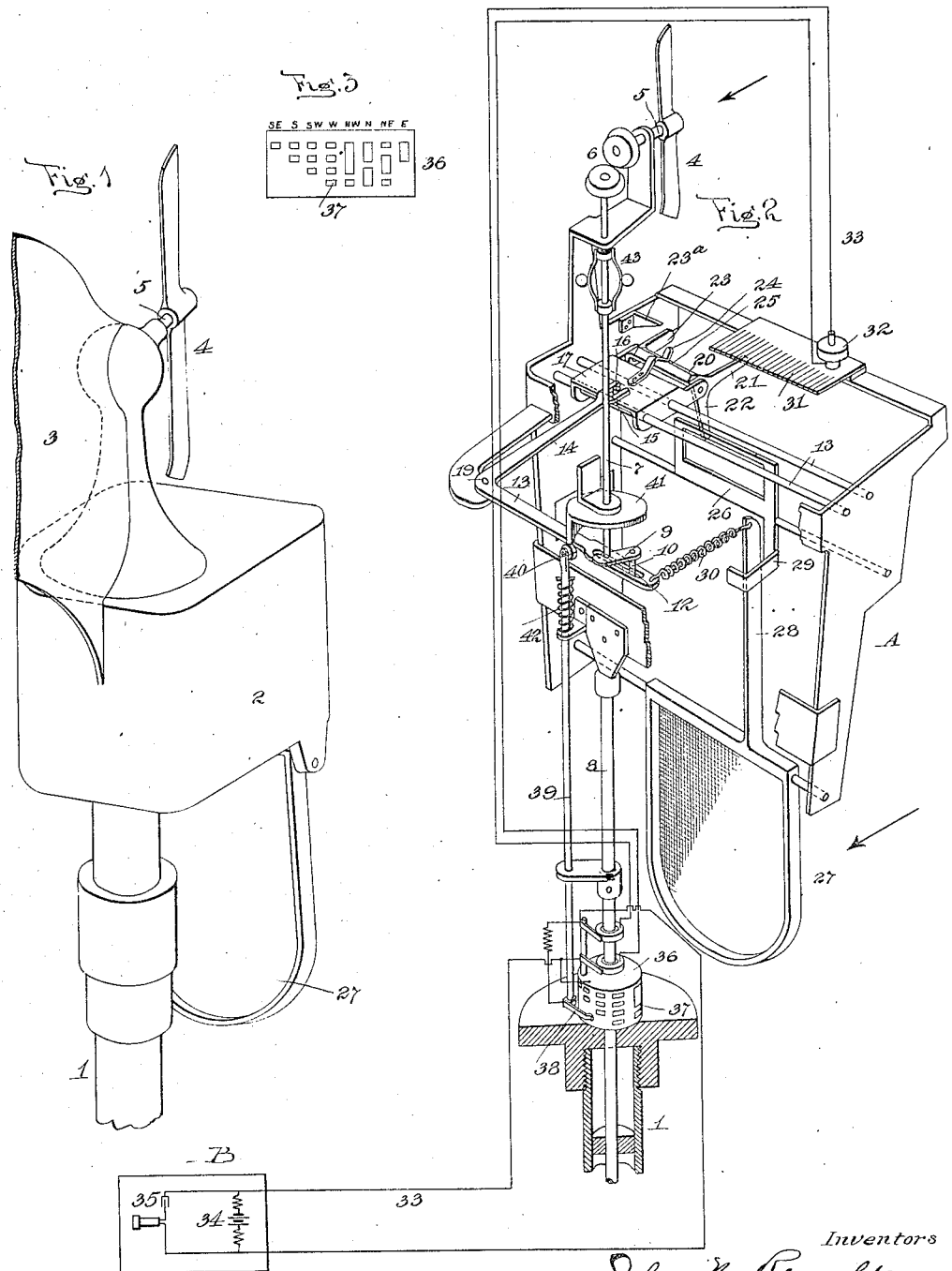

Patented Feb. 4, 1930

1,745,714

UNITED STATES PATENT OFFICE

JOHN N. REYNOLDS AND ANITA S. REYNOLDS, OF GREENWICH, CONNECTICUT

METEOROLOGICAL INDICATOR

Application filed November 1, 1919. Serial No. 335,224.

The invention relates to devices for determining the velocity and direction of winds, and more particularly to such a device by means of which the atmospheric conditions may be instantly read at a point distant from that at which they occur.

The objects of the invention are to provide means whereby the velocity and direction of the wind may be received and read as desired at one or more points, and whereby the exact information desired may be received at the instant at which a measurement is made, thereby minimizing the possibility of changes in the atmospheric conditions occurring between the measurements and the reading.

Another object is to provide means whereby information regarding the velocity and direction of the wind may be transmitted to a distant point.

A further object is to provide a simple, cheap and efficient apparatus, which is not liable to get out of order, and by means of which speedy and accurate readings may be made when the wind is gusty, whereby the high and low points may be determined instead of a general average.

A still further object is to provide means whereby readings of the conditions at a plurality of observation stations may be simultaneously taken at a single or at a plurality of receiving stations, or readings at a single or at a plurality of receiving stations may be taken from a single point of observation.

These and further objects will more fully appear in the following specification and accompanying drawings considered together or separately.

One embodiment of the invention is illustrated in the accompanying drawings, in which like parts are designated by similar characters of reference, and in which.

Fig. 1 is a perspective view of the device for use as an observation station.

Fig. 2 is a diagrammatic view of the system.

Fig. 3 is a developed view of the wind direction indicating drum.

Fig. 4 is a diagrammatic illustration of a modified form of drive for the driving mechanism for the transmitting station.

Fig. 5 is a diagram showing a modified form of impulse sending mechanism.

Fig. 6 is a diagrammatic view of a further modification, and

Fig. 7 is a diagram showing the device adapted for wireless signalling.

In the embodiment of the invention illustrated an observation station A is provided. This station comprises a support 1 which may be carried by, or form part of, any preferred structure, such as a mast, a balloon, kite, target, etc., and carried on the support is a casing 2 which is free to rotate about a vertical axis, and which carries all of operating mechanism which is located at the observation point. The casing is preferably provided with a vane 3 by means of which the device is held normal to the wind.

The device as illustrated is intended to be mounted with 1 in a fixed position. When suspended by a kite or balloon the direction indicator remains in a fixed position operated by the kite string and only the speed mechanism is sent aloft.

Mounted on the exterior of the casing is a screw propeller 4 so positioned relatively to the vane 4 that it will always be held in the wind and adapted to be rotated thereby. The propeller is mounted on a horizontal shaft 5 and, by means of bevel gearing 6, transmits motion to a vertical shaft 7 which is in axial alinement with a post 8 which carries the casing 2 and which is rotatable in the support 1.

Rigidly carried by the shaft 7 is a crank arm 9 the free extremity of which carries a pin 10 which engages an elongated slot 12 in one arm 13 of a bell-crank lever pivoted in the casing 2. The other arm 14 of the bell-crank is slotted as at 15 and engages a pin 16 in a carriage 17 slidable on rods 18 carried in the casing. As the propeller 4 is rotated by the wind the crank 9 will cause the bell-crank to rock on its pivot 19 and the carriage 17 will be moved back and forth on the rods 18.

Pivoted to the carriage 17 is a rocker plate 20 carrying a plectrum 21, a finger 22 and a resetting arm 23 adapted to engage a cam plate 23ª. A spring 24 secured to the carriage 17 engages a ridge 25 on the plate 20 whereby the latter may be held by the spring in either of two positions. The finger 22 is normally held by the spring 24 in engagement with a rail forming part of a lever 26 pivoted in the casing 2 and below the carriage.

Pivoted within the casing 2 and projecting therefrom so as to be acted on by the wind is a screen 27. The plane of the screen is disposed at right angles to the plane of the vane 3, whereby the screen will always be presented broadside to the wind. An extension 28 of the screen is normally held in engagement with an arm 29 of the lever 26 by means of a weighing spring 30 one end of which is attached to the extension 28, and the opposite end of which is secured to the free extremity of the arm 13 of the bell-crank 13—14.

The plectrum 21 cooperates with a set of reeds 31 carried within the casing 2. The plectrum normally travels on a plane below that of the reeds. A transmitter button 32 is carried within the casing and in contact with the reeds 31. The button 32 is in an electric circuit 33 in which is included a battery 34 and a telephone receiver 35 located in a receiving station B.

Rigidly secured to the support 1 is a drum 36 of insulating material to the surface of which is secured a series of contact plates 37. Cooperating with the plates is a contact finger 38 carried on a rod 39. The finger is in the same circuit as is the receiver 35. The rod is arranged parallel to the axis of the post 8 and is preferably directly below the vane 3. The rod 39 is carried by the casing 2 and rotates therewith about the axis of the post 8. The upper end of the rod carries an anti-friction roller 40 which is held in engagement with a cam 41 fast on the shaft 7 by means of a spring 42. As the cam 41 rotates the finger is moved longitudinally of the drum 36.

The plates 37 are arranged in several vertically disposed sets, each set corresponding with a point of the compass, and in different combinations as to length, number and arrangement of plates whereby different series of dot and dash signals may be transmitted to the receiver 35 as the casing is swinging in the wind and the finger 38 is caused to travel up and down the drum by the cam 41. The drum 36 is located within the casing 2.

A governor 43 of any desired type may be and preferably is employed to prevent the mechanism from overspeeding. It is to be understood that the governor may be dispensed with if desired.

The operation is as follows:

Assuming that the device is to be used on an island to give the velocity and direction of the wind, the observation station A is arranged on a building or an elevated framework as desired, and is so positioned that the contact plate or plates 37 for transmitting the signal "North" will point directly south. The circuit 33 will be extended to the receiving station B located at a convenient point on the mainland.

The station A will be held by the vane 3 with the propeller 4 in position to be acted on by the wind. The propeller will be rotated by the wind pressure and the bell-crank 13—14 will be oscillated by the engagement of the pin 9 in the slot 10 and the carriage 17 will be reciprocated in the guides 18 and carry the plectrum 21 back and forth beneath the reeds 31, and will also move the finger 22 back and forth along the rail of the lever 26, and at the same time the pressure of the wind is exerted on the exposed surface of the screen 27.

The weighing spring 30 is of such strength that it will counterbalance the screen 27 when the wind is blowing at the minimum velocity and the spring is slightly extended by the movement of the bell-crank. When the wind reaches this velocity the plectrum 21 will be opposite the reed of the lowest pitch, that is the longest reed of the set. As the spring is stretched beyond this point it will overbalance the force of the wind on the screen and the latter will be moved slightly against the wind. This will tilt the lever 26 and the engagement of the lever with the finger 22 will rotate the plate 20 and the spring 24 riding over the crest of the ridge 25 will throw the plectrum past the reed of lowest pitch and cause the same to vibrate and give off its characteristic tone. At this time the end of the plectrum is above the plane of the reeds.

The vibrations of the reed will be picked up by the transmitter button 32 and be transmitted to the receiver 35 and the operator will know by the sound received which of the reeds has been vibrated and thereby determine the velocity of the wind at the station A.

The rotation of the shaft 7 by the propeller will cause the contact finger 38 to be vertically reciprocated and as the contact is in engagement with the surface of the stationary drum 36 the finger 38 will engage plates which are held in line with its travel by the vane 3 and the circuit will be made and broken and a series of impulses will be transmitted to the operator through the receiver, and such dots and dashes will give him the direction of the wind at the point A simultaneously with his receipt of the velocity signals.

As the velocity of the wind increases the pressure on the exposed surface of the screen 27 will increase, the spring 30 will be placed under greater tension and the bell-crank, and with it the carriage 17, must travel a greater distance before the spring will have tension enough to move the screen against the wind. This will bring the plectrum opposite a reed of high pitch which, when struck by the plectrum will transmit a series of more rapid vibrations and a higher note to the receiver.

As the carriage is returned to the extreme left in the drawings, the resetting arm will pass under the cam plate 23ª and the plate will be reset with the plectrum below the level of the reeds and the finger 22 in contact with the rail of the lever 26.

At the station B a set of comparison reeds may be installed. These reeds may carry marks indicating miles per hour and be manually vibrated to compare the tone with the sound received from the station A.

When the station A is mounted on a movable element such as a balloon or kite the direction indicating mechanism may be omitted, and the direction of the wind obtained by other means.

The shaft 7 may be so geared to the shaft 5 that it will rotate at a different speed from that of the propeller.

It is obvious that instead of the wind propeller, any other driving mechanism, such as a clockwork or an electric motor, may be employed. The motor may be mounted on the shaft 5ª and motion may be transmitted to the shaft 7ª by means of any suitable gearing. The motor is in a circuit 33ª which includes a source of energy and a switch. The electric motor has some advantages in that it may be controlled from the station B whereby the mechanism in station A may remain idle except when a reading is desired. The arrangement illustrated has, however, the advantage that only a single circuit is employed.

Instead of the reeds 31 a series of contacts 31ᵇ operated by the element 21ᵇ may be employed. The engagement of the element 21ᵇ with a contact 31ᵇ will complete a circuit 33ᵇ and any type of signals be transmitted to the receiving station.

Also instead of the set of reeds shown a single reed 31ᶜ may be used and the pitch varied by the position on its length of a weight or damper 17ᵈ moved by the carriage 17ᶜ. The carriage 17ᶜ will move longitudinally of the reed 31ᶜ and carry the damper 17ᵈ with it. When the plectrum 21ᶜ strikes the reed only that portion of the reed extending beyond the damper will vibrate, and the vibrations will be transmitted to the button, 32ᶜ.

It is understood that in place of the screen 27ª solid surface, such as shown in Fig. 1, may be used.

Instead of employing a metallic circuit such as 33, the signals may be transmitted from the station or stations A to the station or stations B by wireless. This method is particularly desirable in transmitting information to air craft approaching a landing or in transit.

In Fig. 7 is shown, diagrammatically, means whereby signals from the sending to the receiving station may be transmitted by wireless. In the drawings A' designates a transmitting station in which a transmitter button 33ᵈ is installed. This button may be in all respects similar to the button 32 and is adapted to cooperate with a vibrating element similar to 31, or the like. The button is in circuit with a modulator 44 and a high frequency generator 45, by means of which signals determined by vibrations of the element may be transmitted to an antenna 46 and thence to a receiving antenna 47 in a receiving station B'.

In accordance with the provisions of the patent statutes, the principles of the invention, together with the specific method of operation which is now considered to best illustrate the same have been shown, but it is to be understood that such method of operation is merely illustrative, and that the invention may be carried out in other ways.

Having now described the invention what is claimed and desired to be secured by Letters Patent is:

1. A device of the character described, comprising means operated by air flow and making tonal signals indicating the velocity of the flow, means actuated by air flow for making signals indicating the direction of the flow, means for transmitting such signals to a distant point, and a telephone at said distant point for receiving such signals.

2. A device of the character described, comprising means actuated by air flow and making signals indicating the velocity of the flow, means actuated by air flow for making signals indicating the direction of the flow, means for transmitting such signals to a distant point, and telephone means for receiving the signals, the direction signals being audibly distinguishable from velocity signals.

3. A device of the character described, comprising means actuated by air flow for indicating the velocity of the flow, means actuated by air flow for making signals indicating the direction of the flow, electric means for transmitting said signals to a distant point, and means for rendering signals audible and distinguishable one from the other.

4. A device of the character described, comprising a plurality of vibratory members, means actuated by air flow for selecting and vibrating a member determined by the velocity of the flow, means for transmitting the vibrations of the member to a distant point, and a telephone receiver at said point for translating said vibrations into audible signals.

5. A device of the character described, comprising a member exposed to the wind, constantly operating means for exerting a force on the member in the direction opposed to the wind pressure, and means for audibly indicating when said force balances the wind pressure.

6. A device of the character described, comprising a member exposed to the wind, constantly operating means for automatically exerting a force on the member in the direction opposed to the wind pressure, and means for audibly indicating when said force balances the wind pressure.

7. A device of the character described, comprising a member exposed to the wind, constantly operating means for automatically gradually exerting a force on the member in the direction opposed to the wind pressure, and means for audibly indicating when said force balances the wind pressure.

8. A device of the character described, comprising a member exposed to the wind, constantly operating means for exerting a force on the member in the direction opposed to the wind pressure, and electrically operated means located at a distance for audibly indicating when the force exerted by said constantly operated means balances the wind pressure.

9. A device of the character described, comprising a member exposed to the wind, means operated by the wind for exerting a force on the member in the direction opposed to the wind pressure, and electrically operated means controlled by the member for indicating when said force balances the wind pressure.

10. A device of the character described, comprising a member exposed to the wind, constantly operating means for exerting a periodically variable force on the member in the direction opposed to the wind pressure, a vibrating member for indicating when said force balances the wind pressure, and means for maintaining the first mentioned member normal to the wind.

11. A device of the character described, comprising a member exposed to the wind, constantly operating means for exerting a periodically variable force on the member in the direction opposed to the wind pressure, a plurality of vibrating members for indicating when said force overbalances the wind pressure, means for maintaining the member normal to the wind, and means for indicating the direction of the wind.

12. A device of the character described comprising a member exposed to the wind, means for exerting a force on the member in the direction opposed to the wind pressure, means actuated when said force overbalances the wind pressure, means located at a distance from the actuated means and in electrical communication therewith for indicating when said force balances the wind pressure, and means located adjacent the actuated means for simultaneously indicating at the same distant point the direction of the wind at the actuated means.

13. A device of the character described, comprising a pivoted member having a face adapted to be exposed to the wind, means for holding said member with its face normal to the wind, means for exerting force to prevent movement of the member to leeward, means for varying the force, an element actuated by the force varying means, a vibratory body, a device carried by the element and cooperating with the member whereby when said force balances the wind pressure and moves the member to windward the said body will be caused to vibrate, electrical means for transmitting the vibrations to a distant point, and means at said distant point for receiving said vibrations and translating the same into audible signals.

14. A wind speed indicator comprising means for measuring the speed of the wind and means for producing a characteristic sound for each speed to be indicated and means for transmitting said sound by wireless telephone to a distant point.

15. A device capable of measuring a plurality of wind speeds, comprising a series of sound producing members, means for selecting a particular one of said members in accord with a particular one of said plurality of wind speeds, means for operating said selected member, and means for transmitting telephonically the sound produced by said member.

16. A wind speed indicator comprising means for measuring the wind speed, a series of variously pitched reeds, means for selecting a particular reed in accord with the wind speed measured, means for vibrating said reed, and means for transmitting telephonically the said vibration.

17. The combination of a wind speed and direction indicator comprising means for measuring the speed of the wind, means for producing a characteristic sound for each speed to be indicated and means for determining the direction of the wind and means for producing code signals to indicate said direction.

18. A device of the character described, comprising a pivoted member having a face adapted to be exposed to the wind, means for holding said member with its face normal to the wind, means for exerting force to prevent movement of the member to leeward, means for varying the force, an element actuated by the force varying means, means connecting the member and element, means located at a distance from said element and in electrical communication therewith for audibly indicating when said force balances the pressure of the wind and moves the member to windward, to indicate the velocity of the wind, and means for simultaneously and audibly indicating the direction of the wind at the same distant point.

19. A device of the character described, comprising a screen pivoted at one edge thereof, an extension on the screen, a pivoted lever, a spring connecting the lever and extension, means for holding the screen with one face normal to the wind, said spring being so disposed as to move the exposed surface of the screen to windward, means for pivoting the lever to tension the spring to move the screen, and means for indicating the occurrence of said movement.

20. A device of the character described, comprising a screen pivoted at one edge thereof, an extension on the screen, a pivoted lever, a spring connecting the lever and extension, means for holding the screen with one face normal to the wind, said spring being so disposed as to move the exposed surface of the screen to windward, means actuated by the wind for pivoting the lever to tension the spring to move the screen, and means for indicating the occurrence of said movement.

21. A device of the character described, comprising a screen pivoted at one edge thereof, an extension on the screen, a pivoted lever, a spring connecting the lever and extension, means for holding the screen with one face normal to the wind, said spring being so disposed as to move the exposed surface of the screen to windward, means actuated by the wind for pivoting the lever to tension the spring to move the screen, and means for indicating the occurrence of said movement, and means governed by said actuating means for simultaneously indicating the direction of the wind.

22. A device of the character described, comprising a member exposed to wind pressure, means for determining the speed of the wind by measuring the force necessary to overcome the wind pressure on the member, and means in electrical communication with the measuring means for transmitting the value of said force phonically.

23. A device of the character described, comprising a movable member exposed to wind pressure, constantly operating means for applying a variable force to the member in opposition to the wind pressure, and means for determining the intensity of said force when said force overcomes the pressure of the wind.

24. A device for measuring the pressure of the wind, comprising a shutter held closed by the wind, constantly operating means for applying a variable force to oppose the pressure of the wind, a plurality of members each capable when vibrated of producing a distinct sound, and means for vibrating a member to indicate the value of said force when it overcomes the pressure of the wind.

25. In a responsive device, a displaceable means for determining a measurement, a plurality of variously pitched reeds means operable in the displacement of said first means for selecting a particular reed, means for thereupon vibrating said selected reed and means for transmitting to a distant point the vibration of said reed.

26. In a responsive device, a displaceable means, means for producing separably distinguishable tones, means operable in the displacement of said first means in accordance with the increments of said displacement, for selecting a particular tone producing means, and means for sounding said particular tone for the purpose of indicating the amount of said displacement.

27. A device capable of measuring a plurality of wind speeds comprising mechanism operated by the wind so as to be responsive differently in proportion to the force of the wind, means for generating a plurality of signals each characteristic of a certain wind speed per unit of time, a signal selector variably operable by said mechanism for transmitting any one of said signals, and an electrical device at a distant point selectively responsive to said signals.

This specification signed this 25th day of Oct., 1919.

JOHN N. REYNOLDS.
ANITA S. REYNOLDS.